United States Patent
Cafarelli et al.

(10) Patent No.: US 9,219,700 B2
(45) Date of Patent: Dec. 22, 2015

(54) NETWORK SWITCH WITH TRAFFIC GENERATION CAPABILITY

(75) Inventors: Dominick Cafarelli, Ossining, NY (US); Patrick Pak Tak Leong, Palo Alto, CA (US)

(73) Assignee: Gigamon Inc., Santa Clara, CA (US)

( * ) Notice: Subject to any disclaimer, the term of this patent is extended or adjusted under 35 U.S.C. 154(b) by 329 days.

(21) Appl. No.: 13/177,079

(22) Filed: Jul. 6, 2011

(65) Prior Publication Data
US 2013/0010613 A1 Jan. 10, 2013

(51) Int. Cl.
*H04L 13/10* (2006.01)
*H04L 12/939* (2013.01)
*H04L 12/931* (2013.01)
*H04L 29/06* (2006.01)

(52) U.S. Cl.
CPC ............ *H04L 49/555* (2013.01); *H04L 49/208* (2013.01); *H04L 63/1425* (2013.01); *H04L 63/308* (2013.01)

(58) Field of Classification Search
USPC .................................. 370/242–252; 709/224
See application file for complete search history.

(56) References Cited

U.S. PATENT DOCUMENTS

| | | | | |
|---|---|---|---|---|
| 6,453,345 | B2 * | 9/2002 | Trcka et al. .................... | 709/224 |
| 7,653,006 | B1 * | 1/2010 | Marino et al. ................ | 370/252 |
| 7,848,326 | B1 | 12/2010 | Leong et al. | |
| 7,855,974 | B2 * | 12/2010 | Merkey et al. ................ | 370/252 |
| 2001/0055274 | A1 * | 12/2001 | Hegge et al. .................. | 370/229 |
| 2004/0034703 | A1 | 2/2004 | Phadke | |
| 2005/0066000 | A1 | 3/2005 | Liaw et al. | |
| 2005/0254490 | A1 | 11/2005 | Gallatin et al. | |
| 2007/0189734 | A1 | 8/2007 | Yamamoto et al. | |
| 2009/0262745 | A1 | 10/2009 | Leong et al. | |
| 2011/0211473 | A1 * | 9/2011 | Matityahu et al. ............ | 370/252 |
| 2012/0051229 | A1 * | 3/2012 | Feldmann et al. ............ | 370/242 |

FOREIGN PATENT DOCUMENTS

CN 101018165 A 8/2007

OTHER PUBLICATIONS

International Search Report and Written Opinion for corresponding application PCT/US2011/045788, dated Dec. 6, 2011.
European Office Action for PCT/US2011/045788 (EP Application No. 11869148.4), dated Apr. 16, 2014.
Notice of Reason for Refusal dated Jan. 21, 2015 for corresponding Japanese Patent Application No. 2014-518532, 5 pages.
Extended European Search Report for EP Patent Application No. 11869148.4, dated Nov. 17, 2014 (6 pages).
Notice of Reason for Refusal mailed Sep. 7, 2015, for Japanese Patent Application No. 2014-518532, filed Jul. 28, 2011, 6 pp.
First Office Action mailed Sep. 25, 2015, for Chinese Patent Application No. 2011800723170, 9 pages.

\* cited by examiner

*Primary Examiner* — Kwang B Yao
*Assistant Examiner* — Juvena Loo
(74) *Attorney, Agent, or Firm* — Perkins Coie LLP (57) ABSTRACT

A packet switch system includes a packet switch appliance having a first network port configured to receive packets, and a first instrument port configured to communicate with a network monitoring tool, a storage system for storing the packets, and an integrated circuit configured to retrieve the packets from the storage system, and retroactively transmit the packets to the first instrument port in a play-back configuration in response to a user's command.

17 Claims, 6 Drawing Sheets

NETWORK SWITCH WITH TRAFFIC GENERATION CAPABILITY

FIELD

This application relates generally to network switch devices.

BACKGROUND

Network switches have been used to forward packets from one node to another node. Such network switch devices include a first network port for receiving packets from a first node, and a second network port for passing the packets to a second node.

Applicant of the subject application has determined that it would be advantageous to store received packets at a medium that is associated with a network switch device, and retroactively transmit the packets in a play-back configuration, thereby providing the network switch device with a network traffic re-generation feature. Such packet switch device may have one or more network ports for connection to the packet-switching network and one or more instrument ports connected to one or more network instruments for monitoring packet traffic, such as packet sniffers, intrusion detection systems, application monitors, or forensic recorders.

SUMMARY

In accordance with some embodiments, a packet switch system includes a packet switch appliance having a first network port configured to receive packets, and a first instrument port configured to communicate with a network monitoring tool, a storage system for storing the packets, and an integrated circuit configured to retrieve the packets from the storage system, and retroactively transmit the packets to the first instrument port in a play-back configuration in response to a user's command.

In accordance with other embodiments, a method of packet processing includes receiving packets at a first network port of a network switch appliance, storing the packets in a storage device, receiving a command from a user, in response to the received command, retrieving the packets from the storage device, and retroactively transmitting the packets to the first instrument port in a play-back configuration.

In accordance with other embodiments, a packet switch system includes a packet switch appliance having a first network port configured to receive packets, and a first instrument port configured to communicate with a network monitoring tool, and an integrated circuit configured to retrieve the packets from a storage system, and retroactively transmit the packets to the first instrument port in a play-back configuration in response to a user's command, wherein the integrated circuit is configured to retroactively transmit the packets to the first instrument port based on a pre-determined packet transmission scheme, and wherein the pre-determined packet transmission scheme comprises packet transmission from the first network port to the first instrument port, packet transmission from a plurality of network ports at the packet switch appliance that include the first network port to the first instrument port, packet transmission from the plurality of network ports that include the first network port to a plurality of instrument ports at the network switch appliance that include the first instrument port, or packet transmission from the first network port to the plurality of instrument ports that include the first instrument port.

In accordance with other embodiments, a packet switch system includes a storage system configured to receive packets from a packet switch appliance, and store the packets for later processing, and an integrated circuit configured to retrieve the packets from the storage system, and retroactively transmit the packets through an instrument port at the packet switch appliance to a network monitoring tool in a play-back configuration in response to a user's command.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Figure 1:
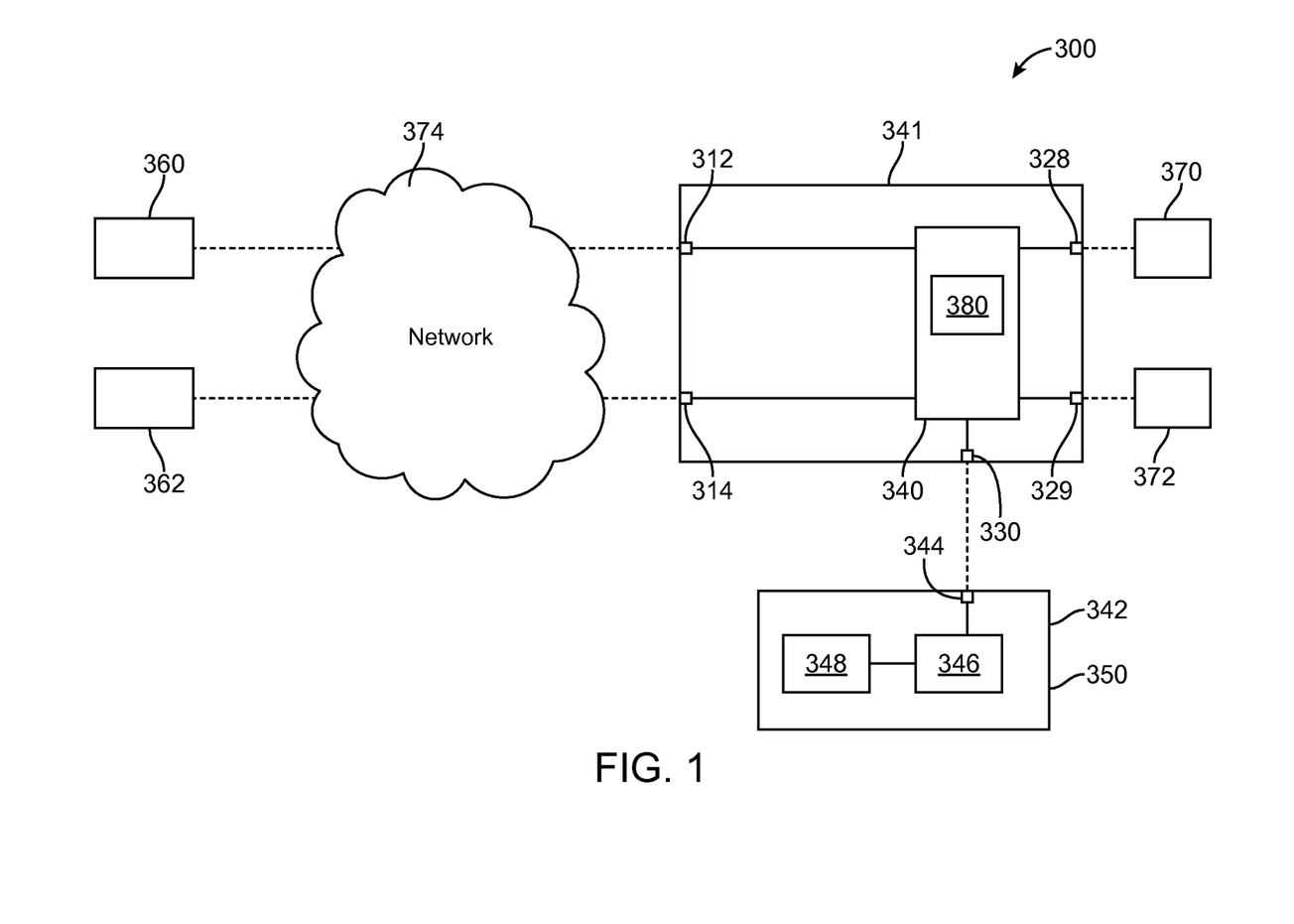
FIG. 1 illustrates a packet switch device in accordance with some embodiments.

FIG. 1 illustrates a network switch device 300 that includes traffic generation capability in accordance with some embodiments. The network switch device 300 includes a first network port 312, a second network port 314, a first instrument port 328, and a second instrument port 329. The device 300 also includes a packet switch 340, and a network switch housing 341 for containing the packet switch 340. In the illustrated embodiments, the device 300 also includes other components, such as a Network PHY (not shown) coupled to each of the respective ports 312, 314, wherein the Network PHYs may be considered to be parts of the packet switch 340. Alternatively, the Network PHYs may be considered to be components that are separate from the integrated circuit 340. The PHY is configured to connect a link layer device to a physical medium such as an optical fiber, copper cable, etc. In other embodiments, instead of the PHY, the device 300 may include an optical transceiver, or a SERDES, etc. The housing 341 allows the device 300 to be carried, transported, sold, and/or operated as a single unit. The ports 312, 314, 328, 329 are located at a periphery of the housing 341. In other embodiments, the ports 312, 314, 328, 329 may be located at other locations relative to the housing 341. Although two network ports 312, 314 are shown, in other embodiments, the device 300 may include more than two network ports. Also, although two instrument ports 328, 329 are shown, in other embodiments, the device 300 may include only one instrument port, or more than two instrument ports.

In the illustrated embodiments, the network switch device 300 also includes an integrated circuit 380 for receiving network traffic data from ports 312 and/or 314, processing the network traffic data, and transmitting the network traffic data to instruments 370 and/or 372. As used in this specification, the term "integrated circuit" may refer to one circuit, or a plurality of circuits. The integrated circuit 380 is also configured for generating network traffic using stored data in accordance with some embodiments. In the illustrated embodiments, the integrated circuit 380 is illustrated as a component of the packet switch 340. In other embodiments, the integrated circuit 380 may be a separate component from the packet switch 340. The integrated circuit 380 may be implemented using a processor, such as a general processor, a network processor, an ASIC processor, a FPGA processor, etc. Also, in some embodiments, the same processor that is used to implement the packet switch 340 may also be used to implement functionalities of the integrated circuit 380.

In the illustrated embodiments, the device 300 also includes a port 330 for communicatively connection to a storage device 342. The storage device 342 includes a port 344 for communicating with the device 300, an integrated circuit 346 for processing data, and a non-transitory medium 348 for storing network traffic data. Port 330 and 344 may be configured to communicate through a network or via a direct connect. In some embodiments, the non-transitory medium 348 is configured to store large files, and may have a storage space that is anywhere from 500 gigabytes to 6 terabytes, and more preferably anywhere from 500 gigabytes to 3 terabytes. In other embodiments, the non-transitory medium 348 may have a storage space that is higher than 6 terabytes, such as 30 terabytes. In further embodiments, the non-transitory medium 348 may have a storage space that is higher than 100 terabytes (e.g., several hundred terabytes), or higher than 1000 terabytes (e.g., several thousands terabytes). It should be noted that the non-transitory medium 348 may be configured to have any size, depending on the network depth that a user wishes to have support for.

The integrated circuit 346 may be implemented using a processor, such as a general processor, a network processor, an ASIC processor, a FPGA processor, etc, or combination thereof. Also, in some embodiments, the integrated circuit 346 may be a single circuit, or more than one circuit, e.g., it may be a combination of any of the exemplary components mentioned above. In some embodiments, the storage device 342 may not include the integrated circuit 346. For example, if the integrated circuit 380 is configured to provide functionalities of the integrated circuit 346, then the integrated circuit 346 of the storage device 342 may not be needed. The integrated circuit 346 and/or the integrated circuit 380 may be configured to process network traffic data before the data are stored in the medium 348, and retrieve the stored data in response to a request (e.g., a user request, such as a request transmitted from a tool), and provide the stored data for the user. In the illustrated embodiments, the device 300 is configured to provide the stored data by using the stored data to regenerate a network traffic. In one implementation, the device is configured to generate the network traffic using the stored data by retroactively transmitting the previously stored data in a play-back configuration, so that the data are provided like that in the original traffic stream that includes the data. Embodiments of methods for storing network traffic data, and retroactively regenerating the network traffic using the stored data will be described in further detail below.

In the illustrated embodiments, the storage device 342 further includes a housing 350, which allows the storage device 342 to be carried, transported, sold, and/or operated as a single unit. In some embodiments, the storage device 342 may be considered to be a part of the network switch device 300. In other embodiments, the network switch device 300 and the storage device 342 may be considered to be parts of a network switch system. Also, in some embodiments, the storage device may be self-contained with the processor in a single chassis. In other embodiments, the storage device may be in its own chassis. Each storage device may be a single storage unit, or an array (e.g., may have one or more disk drives).

During use, the first network port 312 of the device 300 is communicatively coupled to a first node 360, and the second port 314 is communicatively coupled to a second node 362. The device 300 is configured to communicate packets between the first and second nodes 360, 362 through a network 374 (e.g., Internet) via the network ports 312, 314. Also, during use, the instrument ports 328, 329 of the device 300 are communicatively coupled to the respective instruments 370, 372. The instruments 370, 372 may be directly coupled to the device 300, or communicatively coupled to the device 300 through the network 374. In some cases, the device 300 is provided as a single unit that allows the device 300 to be deployed at a single point along a communication path. In the illustrated embodiments, the packet switch 340 is configured to receive packets from nodes 360, 362 via the network ports 312, 314, and process the packets in accordance with a pre-defined scheme. For example, the packet switch 340 may pass packets received from one or more nodes to one or more instruments that are connected to respective instrument port(s) 328, 329.

In any of the embodiments, the packet switch 340 may be any switch module that provides packet transmission in accordance with a pre-determined transmission scheme. In some embodiments, the packet switch 340 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 300 after the packets have been processed), such as an intrusion prevention system. In other embodiments, the packet switch 340 may be configured such that the packets may be transmitted in a one-to-many configuration (i.e., from one network port to multiple instrument ports). In other embodiments, the packet switch 340 may be configured such that the packets may be transmitted in a many-to-many configuration (i.e., from multiple network ports to multiple instrument ports). In further embodiments, the packet switch 340 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 300 so that the packets (or certain types of packets) are routed according to any one of these configurations. In some embodiments, the packet movement configuration is predetermined such that when the device 300 receives the packets, the device 300 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 340 that may be used to implement features described herein include any of the commercially available network switch devices, such as GigaVUE™, that is available at Gigamon LLC. Other examples of packet switch 340 that may be used to implement features described herein are described in U.S. patent application Ser. Nos. 12/148,481, 12/255,561, 11/123,273, 11/123,465, and Ser. No. 11/123,377, the entire disclosure of all of which is expressly incorporated by reference herein.

In accordance with some embodiments, the packet switch 340 may have the functionalities of a conventional packet switch except that it provides visibility into various parts of a network. Thus, embodiments of the packet switch 340 may operate like a conventional managed packet switch, but providing packet monitoring function. This is accomplished by configuring the packet switch 340 to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch 340 that may be used with the device 300 is not limited to the examples described above, and that other packet switches 340 with different configurations may be used as well. Also, in any of the embodiments described herein, the packet switch 340 may be implemented using an integrated circuit, such as a processor (e.g., a general purpose processor, a network processor, an ASIC processor, a FPGA processor, etc.).

Figure 2:
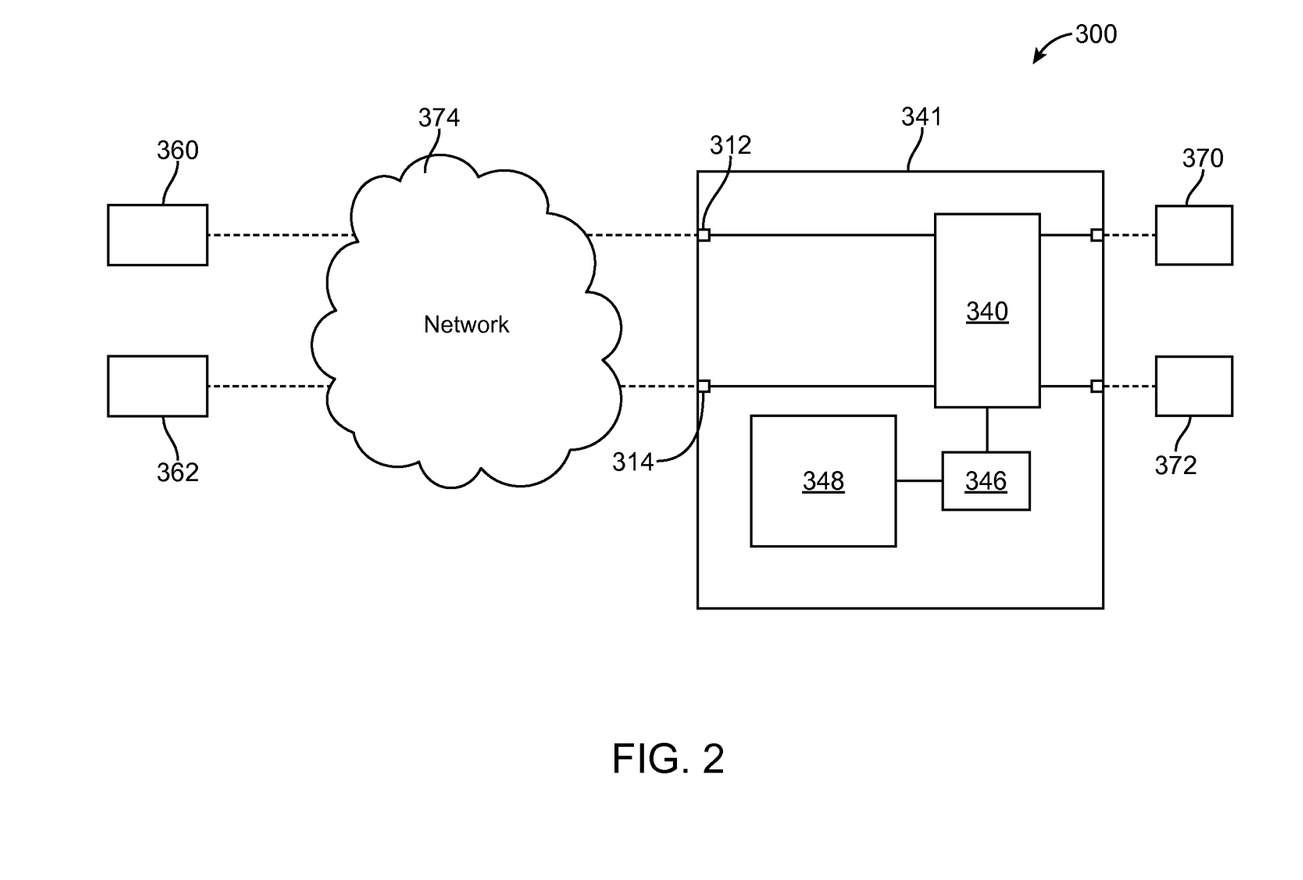
FIG. 2 illustrates another packet switch device in accordance with other embodiments.

In the above embodiments, the storage device 342 is illustrated as having a housing 350 that is separate from the housing 341. In other embodiments, the storage device 342 may be implemented as a component that is inside the housing 341 of the network switch device 300. In such cases, one or more of the components of the storage device 342 may be located inside the housing 341 of the network switch device 300. FIG. 2 illustrates another network switch device 300 in accordance with other embodiments. The network switch device 300 is the same as the network switch device 300 of FIG. 1, except that the integrated circuit 346 and the non-transitory medium 348 are located inside the housing 341 of the network switch device 300. In some embodiments, the integrated circuit 346 may be configured to implement functions of the integrated circuit 380, and therefore, the device 300 does not include two separate integrated circuits 380, 346. In other embodiments, integrated circuit 346 may be a processor, and the switch 340 may also include its own processor 380 (like that shown in FIG. 1), in which cases, the device 300 will include two processors 346, 380.

Figure 3:
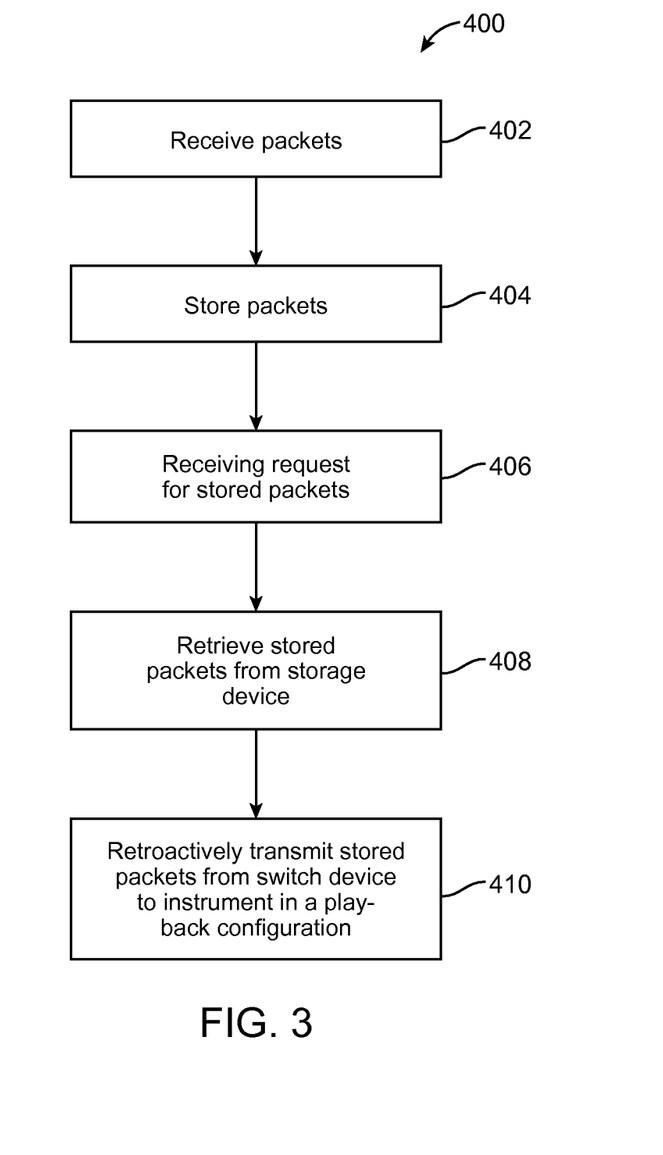
FIG. 3 illustrates a method of providing network traffic data performed using the packet switch device of FIG. 1 in accordance with some embodiments.

FIG. 3 illustrates a method 400 for storing network traffic data and providing the stored data in accordance with some embodiments. The method 400 will be described with reference to the embodiments of the device 300 of FIG. 1 or FIG. 2. However, it should be understood that the method 400 may be performed using other devices, and therefore, should not be limited to the example described herein. First, packets are received at the network port 312 of the network switch device 300 (Item 402). The receiving of the packets may be performed by the device 300 in response to the node 360 transmitting a traffic stream that includes the packets through the network 374.

Next, the received packets are stored in the storage device 342 (Item 404). In the illustrated embodiments, after the switch 340 receives the packets, the switch 340 time-stamps the packets, and then transmits the time-stamped packets to the medium 348 for storage. In other embodiments, if the storage device 342 includes the component 346, then the component 346 may be used to time-stamp the packets before they are stored in the medium 348. The stored packets allow them to be retrieved and processed later. In some embodiments, only part(s) of the packets that are in a same session is time-stamped. This obviates the need to time-stamp every packets that go through the device 300, which may be inefficient. In other embodiments, all packets that go through the device 300 may be time-stamped.

Next, the device 300 receives a command from a user that requests for certain stored packets (Item 406), and in response to the received command, retrieves the packets from the storage device 342 (Item 408). In some embodiments, the command from the user may be transmitted from a computer to the device 300. The computer for transmitting the command may be directly coupled to the device 300, or alternatively, communicatively coupled to the device 300 through a network (e.g., the network 374). In further embodiments, the device 300 may be configured (e.g., built and/or programmed) so that it will automatically generate a command when a pre-determined condition occurs (e.g., when a predetermined time is reached, when packets directed to a certain destination address is received, etc.). In such cases, the act of receiving the command may be considered performed during the configuration and/or programming of the device 300. In the illustrated embodiments, in response to the received command, the integrated circuit 380 and/or the integrated circuit 346 looks up the information stored in the non-transitory medium 348, and retrieves the requested packets from the non-transitory medium 348. For example, the command may request for packets having time-stamp that is within a certain prescribed range. In such cases, the integrated circuit 380 and/or circuit 346 may access the medium 348, and retrieve packets with time-stamp that satisfies the command. In some embodiments in which only a subset of the packets belonging to a same session is time-stamped, the integrated circuit 380 and/or the circuit 346 may retrieve the subset of the packet(s) that was time-stamped, as well as all other un-time-stamped packets that belong to the same session. In other embodiments, instead of looking up stored packets by the time-stamp information, the device 300 may be configured to look up stored packets based on session identification, source IP address, destination IP address, or combination thereof (e.g., source and destination IP addresses).

Next, the device 300 retroactively transmits the retrieved packets to the instrument port 328 so that the instrument 370 coupled to the instrument port 328 will receive the packets in a play-back configuration (Item 410). The play-back configuration allows the instrument that is communicatively coupled to the instrument port 328 to not only receive packets that were previously received by the device 300, but also allows the instrument to receive such packets as if they are in the original network traffic stream. In some embodiments, the "play back" of the packets may involve passing the packets through the switch 340, which transmits the played-back packets in accordance with a predetermined packet processing scheme (e.g., packets from any of the network ports to any of the instrument ports (any-to-any), packets from a network port to multiple instrument ports (one-to-many), packets from multiple network ports to an instrument ports (many-to-one), or packets from multiple network ports to multiple instrument ports (many-to-many)). Additionally, or alternatively, the "play back" of the packets may involve processing the packets by the switch 340, which performs packets filtering and/or mapping on the retrieved packets, passes all retrieved packets, etc.

In some embodiments, the packets stored in the medium 348 are aged out after a prescribed period, and are then deleted (e.g., replaced by newer received packets) from the medium 348. In one implementation, the storing and aging out of the packets after a prescribed period may be performed based on a first-in-first-out (FIFO) rule. By means of non-limiting examples, the prescribed period may be 1 hour, 5 hours, 1 day, 3 days, 1 week, or any of other durations, depending on the storage space of the medium 348 and/or the network traffic condition. Medium 348 having a relatively larger storage space may store more data, and therefore may allow data received within a longer duration to be stored in the medium 348 before they are aged out. Also, if the network traffic condition is busy, the device 300 may receive relatively more packets within a time period. In such cases, the device 300 may be configured (e.g., by building and/or programming the circuit 380 and/or circuit 346) to store data that are received within a shorter duration (i.e., have shorter age-out period). In further embodiments, the device 300 may be configured (e.g., by building and/or programming the circuit 380 and/or circuit 346) to dynamically adjust the prescribed period for aging out the stored data. In one implementation, the dynamically adjustment of the prescribed period may be performed based at least in part on an amount of remaining storage space in the medium 348. For example, when the device 300 detects that there are relatively more storage space remaining, then it may dynamically adjust the age-out period to be longer, and vice versa. In another example, when the device 300 detects that there are relatively more network traffic, then it may dynamically adjust the age-out period to be shorter, and vice versa.

The traffic regeneration feature described herein is benefit because it obviates the need to have the tool (e.g., 370) coupled to the device 300 at the time the packets are initially received at the device 300. For example, the tool 370 may be an expensive piece of equipment that is shared between buildings, and therefore it cannot be used as a fixed deployment to the device 300. In such cases, the device 300 may receive the packets first without having the tool coupled thereto. At a later time, the tool may then be coupled to the device 300, and the device 300 then regenerate the network traffic using the stored packets, so that the tool receives the packets in a play-back configuration as if they are being transmitted in the original network traffic stream. Transmitting the previously stored data in a play-back configuration is advantageous because it allows data to be provided like that in the original traffic stream. In particular, in one scenario, playing back the "Whole Stream" through the device 300 allows a user to replay or reanalyze the original stream of traffic using tool(s) that may not have been available.

Also, the time stamp feature is advantageous because it allows the device 300 to play back the packets to the tools very quickly (e.g., faster than that in the original network traffic transmission). If the tool (e.g., tool 370) understands the time stamped packets from the device 300, it may analyze the traffic quickly. For example, if the packets come in over a period of 10 hours but there are only a few of them, a tool (without the benefit of the time stamped packets from the device 300) will need to wait for 10 hours to receive all of the relevant packets. With the time stamp feature provided by the device 300, the device 300 may retrieve the packets that are stored over a long period (10 hours in the above example), organize them into a network traffic stream (i.e., so that the packets are in the right order), and transmit the time stamped packets to the tool 370. Because only the relevant packets based on the time stamp(s) are retrieved and organized into a network traffic stream, the irrelevant packets (e.g., packets belonging to other sessions) received in-between the relevant packets from the original network traffic transmission are excluded from the recreated network traffic stream. Thus, in the example, the tool may very quickly receive all of the relevant packets obtained by the device 300 over 10 hours, and process the packets very quickly. It is like fast forwarding the packets.

In other embodiments, the integrated circuit 380 and/or circuit 346 may be configured to remove the timestamps for the packets before the packets are transmitted to an instrument port. Such configuration is advantageous in the situation in which the tool coupled to the instrument port does not understand the timestamps.

Also, in other embodiments, instead of fast forwarding the packets, the device 300 may be configured to transmit the retrieved packets in a slowed-down configuration. In further embodiments, the device 300 may provide a user interface for allowing a user to prescribe how fast to transmit the retrieved packets from the medium 348 to the tool (e.g., tool 370). One benefit of the slowed down configuration is that it enables tool(s) coupled to the instrument port(s) to perform packet analysis without having to drop or discard packets that may otherwise occur if the network traffic stream is transmitted too fast for the tool(s) (e.g., network traffic stream that is transmitted at the original speed). In other embodiments, the device 300 (e.g., the integrated circuit 380 and/or circuit 346) may be configured to receive a feedback from a tool to indicate a processing capability of the tool, and the device 300 (e.g., the integrated circuit 380 and/or circuit 346) then dynamically adjusts the playback speed adaptively to maintain the maximum throughput of traffic processing for the tool.

Figure 4:
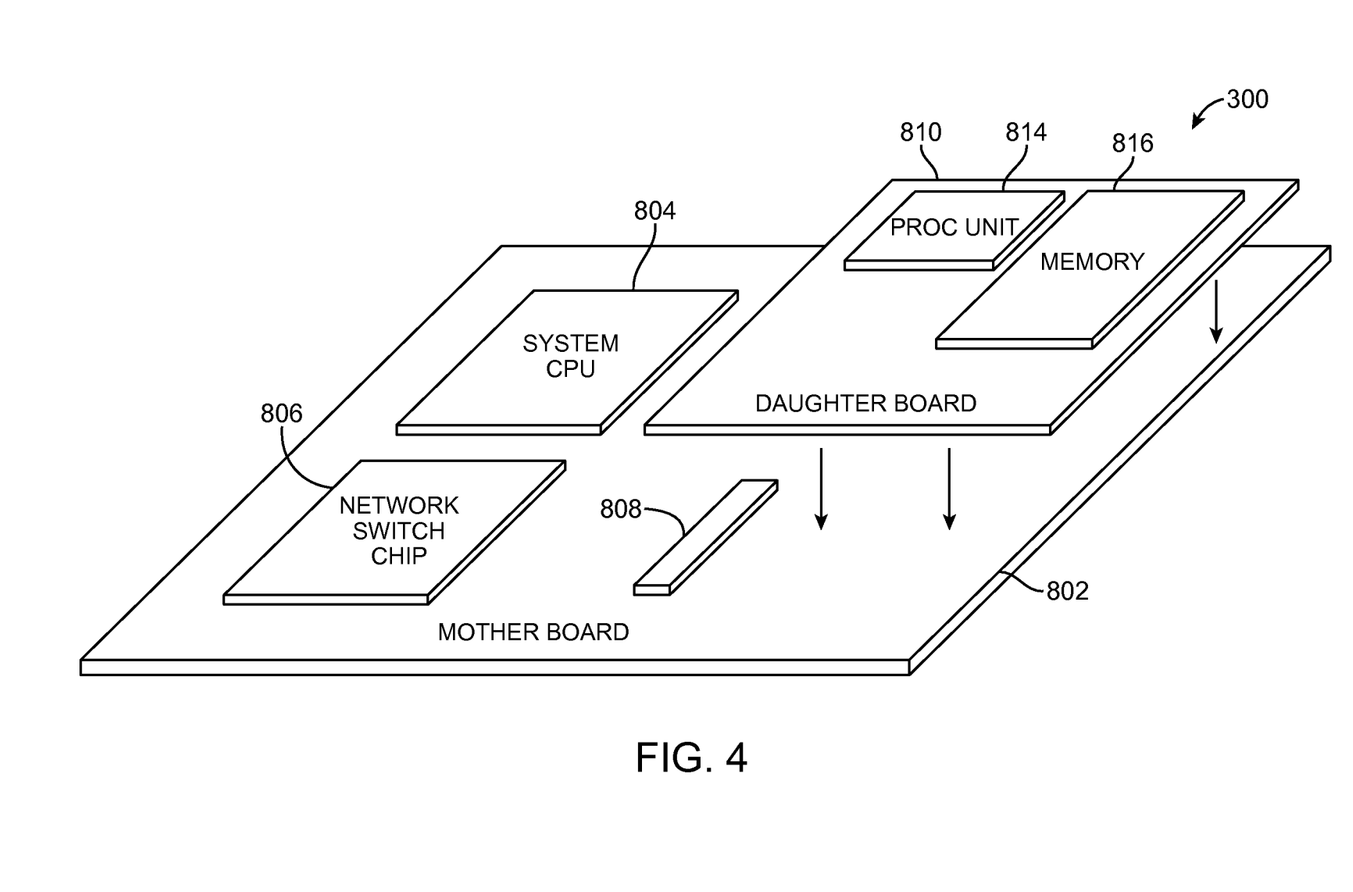
FIG. 4 illustrates an example of an implementation of the packet switch device of FIG. 1 in accordance with some embodiments.

FIG. 4 illustrates an example of an implementation of the network switch device 300 of FIG. 1 in accordance with some embodiments. In the illustrated embodiments, the network switch device 300 includes a motherboard 802, which is the central or primary circuit board for the network switch device 300. The motherboard 802 includes a system CPU (central processing unit) 804, a network switch chip 806, and a connector 808. The CPU 804 is configured to interpret programming instructions and processes data, among other functions. The network switch chip 806, also referred to as an "Ethernet switch chip" or a "switch on-a-chip", provides packet switching and filtering capability in an integrated circuit chip or microchip design. The connector 808 provides the motherboard 802 with the capacity to removably accept peripheral devices or additional boards or cards. In some embodiments, the connector 808 allows a device, such as a daughter or expansion board, to directly connect to the circuitry of the motherboard 802. The motherboard 802 may also include numerous other components, such as, but not limited to, volatile computer readable storage medium and/or non-volatile computer readable storage medium (both of which may be considered examples of non-transitory medium), display processors, and/or additional peripheral connectors. The packet switch device 300 may also be configured with one or more hardware ports or connectors for connecting servers, terminals, IP phones, network instruments, or other devices to the packet switch device 300.

The network switch chip 806 is provided with a plurality of ports and may also be provided with one or more filters. The ports may each be half-duplex or full-duplex. Each of the ports may be configured, either separately, or in combination, as a network port, an instrument port, a transport port, or a loop-back port. Network ports are configured for connection to and/or from the network. Instrument ports are configured for connection to and/or from a network instrument, such as a packet sniffer, intrusion detection system, or the like. Transport ports are configured for connection to and/or from another network switch ship, another switch device (appliance), or a processor unit.

In some embodiments, the network switch device 300 may include instructions stored on a computer readable medium for configuring single or dual port loop-back ports. The instructions may be executed on the CPU 804. Each loop-back port reduces the number of ports available to be configured as a network, instrument, or transport port by at least one.

Also, in some embodiments, each of the ports of the network switch chip 806 may be associated with one or more packet filters that drop or forward a packet based on a criterion.

As shown in the illustrated embodiments of FIG. 4, the packet switch device 300 may include a daughter board 810 configured to be removably connected to the motherboard 802 via the connector 808. The daughter board 810 may be connected parallel to or in the same plane as the motherboard 802, as shown. In the parallel configuration, the daughter board 810 may also be referred to as a mezzanine board. Alternatively, the daughter board 810 may be oriented perpendicularly to the plane of the motherboard 802, or it may be connected in a different orientation. The daughter board 810 provides, in addition to packet distribution capabilities, other packet processing capabilities. The daughter board 810 has a processor unit 814, and a memory 816. As with the motherboard 802, the daughter board 810 may also include numerous other components (like those discussed with reference to the motherboard 802). The processor unit 814 may be any integrated circuit capable of routing and processing packets, such as time-stamping packets received at the device 300, retrieving stored packets from a medium, and/or regenerating network traffic using the retrieved packets. Alternatively, any or all of these functions may be performed using the system CPU 804. The memory 816 may be used to implement the memory 348 of FIG. 1 or FIG. 2.

In some embodiments, the daughter board 810 may be used to implement the integrated circuit 380 and/or circuit 346 for retrieving packets from the medium, and re-generating network traffic using the retrieved packets. In other embodiments, the motherboard 802 may be used to implement the integrated circuit 380 and/or circuit 346 for retrieving packets from the medium, and re-generating network traffic using the retrieved packets. In further embodiments, both the motherboard 802 and the daughter board 810 may be used to implement the integrated circuit 380 and/or circuit 346 for retrieving packets from the medium, and re-generating network traffic using the retrieved packets.

In other embodiments, the processing unit 814 and the memory 816 are parts of a blade server, parts of motherboard 802, or parts of a module in a network switch chip.

Figure 5:
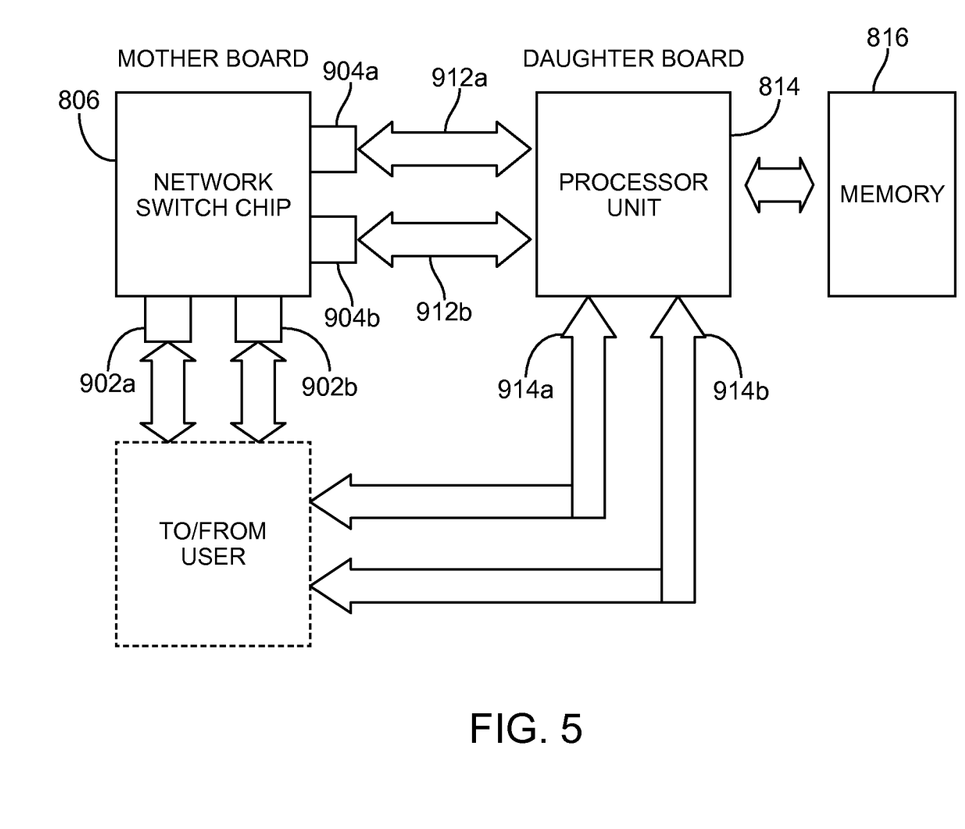
FIG. 5 illustrates an exemplary packet handling process by the packet switch device of FIG. 4 in accordance with some embodiments.

FIG. 5 illustrates logically an example of packet flow in the network switch device 300 of FIG. 4 in accordance with some embodiments. In some cases, a packet may be routed from an ingress port to an egress port that are both located on the network switch chip 806. Assume that port 902a is a network port on the network switch chip 806, that port 902b is an instrument port on the network switch chip 806, that ports 904a and 904b are transport ports on the network switch chip 806, and that connections 912a and 912b are connections between network switch chip 806 and the processor unit 814. Further assume that the packet switch device 300 is configured to route all packets from the network port 902a to the instrument port 902b. An ingress packet received at the network port 902a is routed to the transport port 904a for egress by the network switch chip 806. The packet is received by the processor unit 814 via the connection 912a. In other embodiments, the ingress packet is routed via the transport port 904b and received at connection 912b. The packet is routed back to the network switch chip 806 through connections 912a and transport port 904a for egress at instrument port 902b. The network traffic regeneration using previously stored packets described herein may be performed by component(s) at the daughter board 810, component(s) at the motherboard 802, or components at both the motherboard 802 and the daughter board 810.

It should be noted that the packet switch device 300 is not limited to the configuration described previously, and that the packet switch device 300 may have different configurations in other embodiments. For example, in other embodiments, the device 300 may not have any daughter board. In such cases, the packet deduplication feature described herein may be performed by a processor or another integrated circuit that is located on the motherboard 802.

Figure 6:
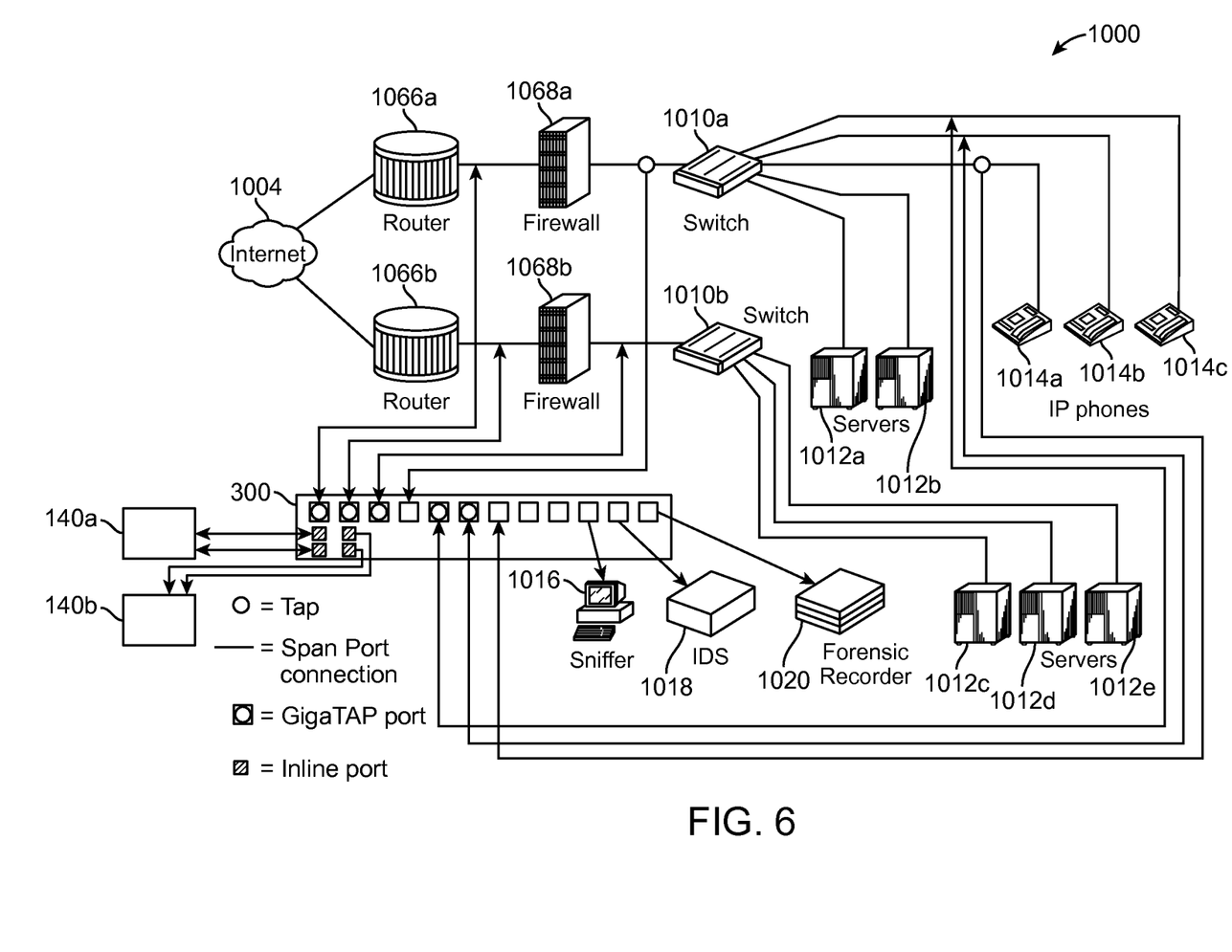
FIG. 6 shows an example of a deployment of the network switch device of FIG. 1 in a network environment in accordance with some embodiments.

FIG. 6 shows the deployment of the network switch device 300 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 300. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 300. The user has complete flexibility to channel whatever traffic to whatever instrument or groups of non-pass through instruments, using the any-to-any, any-to-many, many-to-one, and many-to-many capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function. The network traffic regeneration feature of the device 300 described herein allows the device 300 to store received packets, retrieve the stored packets at a later time, and regenerate the network traffic using the retrieved packets.

In some embodiments, when using the device 300, one or more non-pass through instruments (such as IDS, sniffer, forensic recorder, etc.) may be connected to instrument port(s), and one or more pass through instruments 140*a*, 140*b* (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 300, the device 300 can compare whether the IDS or the IPS sees more threats, and/or can have a redundant protection such that if the IPS misses any threat, the IDS may pick it up.

It should be noted that when a "packet" is described in this application, it should be understood that it may refer to the original packet that is transmitted from a node, or a copy of it.

It should be noted that the term "first" (as in "first packet" for example), and the term "second" (as in "second packet" for example), are used to refer to different things, and do not necessarily refer to the order of things. Thus, the term "first packet" does not necessarily refer to a packet that is "first" received, and may refer to any packet that is different from a "second" packet. Similarly, the term "second packet" does not necessarily refer to a packet that is received in the "second" order, and may refer to any packet that is different from a "first" packet.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A packet switch system, comprising:
   a packet switch appliance having a plurality of network ports to receive packets, each of the network ports to receive packets from a different one of a plurality of network nodes external to the packet switch system, and a plurality of instrument ports, each configured to communicate with a different one of a plurality of network monitoring tools external to the packet switch system, wherein the packet switch appliance is configured to perform packet transmission according to a user-configurable transmission scheme, and wherein the packet switch appliance enables each of the following to be selected as the user-configurable transmission scheme:
   a) packet transmission from any specified one of the plurality of network ports to any specified one of the plurality of instrument ports;
   b) packet transmission from any specified one of the plurality of network ports to any specified two or more of the plurality of instrument ports;
   c) packet transmission from any specified two or more of the plurality of network ports to any specified one of the plurality of instrument ports; and
   d) packet transmission from any specified two or more of the plurality of network ports to any specified two or more of the plurality of instrument ports;
   wherein the user-configurable transmission scheme can vary from packet to packet;
   a storage system to store the packets; and
   an integrated circuit configured to retrieve the packets from the storage system and retroactively transmit the packets to one or more of the plurality of instrument ports, for a transmission to a corresponding one or more of the plurality of network monitoring tools, according to one or more of said transmission schemes a), b), c) or d) as previously configured and as applicable for each packet.

2. The packet switch system of claim 1, wherein the integrated circuit is configured to transmit the packets through a period of time that is shorter than a period of time the packet switch appliance took to receive the packets.

3. The packet switch system of claim 1, wherein the integrated circuit is located in the packet switch appliance.

4. The packet switch system of claim 1, wherein the integrated circuit is configured to provide a user interface for allowing the user to input the command.

5. The packet switch system of claim 1, wherein the storage system comprises a plurality of disks.

6. The packet switch system of claim 1, wherein the storage system comprises at least 500 gigabytes of space.

7. The packet switch system of claim 1, wherein the storage system comprises at least 3 terabytes of space.

8. The packet switch system of claim 1, wherein the integrated circuit is configured to process the packets by time-stamping at least some of the packets before storing the packets in the storage system.

9. The packet switch system of claim 1, wherein the storage system is located in the packet switch appliance.

10. The packet switch system of claim 1, wherein the storage system is external to the packet switch appliance.

11. The packet switch system of claim 1, wherein the integrated circuit is configured to transmit the packets in a slowed-down configuration such that the packets are transmitted through a period of time that is longer than a period of time the packet switch appliance took to receive the packets.

12. The packet switch system of claim 1, wherein the storage system is configured to age-out the packets stored therein based on a satisfaction of certain criteria.

13. A method of packet processing, comprising:
    receiving packets at a plurality of network ports of a packet switch appliance from respective ones of a plurality of network nodes external to the packet switch appliance;
    performing packet transmission in the packet switch appliance to one or more of a plurality of instrument ports of the packet switch appliance according to a user-configurable transmission scheme, each of the instrument ports being configured to communicate with a different one of a plurality of network monitoring tools external to the packet switch appliance;
    enabling each of the following to be selected as the user-configurable transmission scheme in the packet switch appliance:
    a) packet transmission from any specified one of the plurality of network ports to any specified one of the plurality of instrument ports;
    b) packet transmission from any specified one of the plurality of network ports to any specified two or more of the plurality of instrument ports;
    c) packet transmission from any specified two or more of the plurality of network ports to any specified one of the plurality of instrument ports; and d) packet transmission from any specified two or more of the plurality of network ports to any specified two or more of the plurality of instrument ports;

wherein the user-configurable transmission scheme can vary from packet to packet;

storing the packets in a storage device;

receiving a command from a user; and in response to the received command, retrieving the packets from the storage device, and retroactively transmitting the packets to one or more of the plurality of instrument ports, for a transmission to a corresponding one or more of the plurality of network monitoring tools, according to the user-configurable transmission scheme applicable for each packet, including transmitting packets according to at least two of said a), b), c) or d) as previously configured.

14. The method of claim 13, wherein the packets is are transmitted through a period of time that is shorter than a period of time the packet switch appliance took to receive the packets.

15. The method of claim 13, further comprising time-stamping at least some of the packets before storing the packets.

16. The method of claim 13, wherein the packets are transmitted through a period of time that is longer than a period of time the packet switch appliance took to receive the packets.

17. The method of claim 13, further comprising aging-out the packets stored in the storage device based on a satisfaction of certain criteria.

* * * * *